United States Patent
Yang et al.

(10) Patent No.: US 11,412,053 B2
(45) Date of Patent: *Aug. 9, 2022

(54) SCALING SERVICE DISCOVERY IN A MICRO-SERVICE ENVIRONMENT

(71) Applicant: Cisco Technology, Inc., San Jose, CA (US)

(72) Inventors: Yi Yang, Morrisville, NC (US); Wojciech Dec, Amsterdam (NL); Syed Basheeruddin Ahmed, Santa Clara, CA (US); Sanjay Agrawal, San Jose, CA (US); Ruchir Gupta, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,618

(22) Filed: Jul. 8, 2019

(65) Prior Publication Data
US 2019/0335004 A1  Oct. 31, 2019

Related U.S. Application Data

(63) Continuation of application No. 15/217,311, filed on Jul. 22, 2016, now Pat. No. 10,348,838.

(51) Int. Cl.
*H04L 67/51* (2022.01)
*G06F 9/455* (2018.01)

(52) U.S. Cl.
CPC .......... *H04L 67/16* (2013.01); *G06F 9/45558* (2013.01); *G06F 2009/45595* (2013.01)

(58) Field of Classification Search
CPC ................ H04L 67/16; G06F 9/45558; G06F 2009/45595
See application file for complete search history.

(56) References Cited

U.S. PATENT DOCUMENTS 6,442,754 B1   8/2002  Curtis
7,614,059 B2 * 11/2009  Manzano .............. G06F 9/5055
                                                         709/201

(Continued)

FOREIGN PATENT DOCUMENTS

CN      105357233 A    2/2016
EP       2254310      11/2010

OTHER PUBLICATIONS

International Search Report and Written Opinion from PCT Application No. PCT/US2017/041011 dated Sep. 21, 2017.

(Continued)

*Primary Examiner* — Chris Parry
*Assistant Examiner* — Steven C Nguyen
(74) *Attorney, Agent, or Firm* — Polsinelli PC

(57) ABSTRACT

Systems and methods provide for scaling service discovery in a micro-service environment. A controller can inject a service discovery agent onto a host. At least one of the controller or the agent can identify a first set of micro-service containers that are dependencies of the first micro-service container and a second set of micro-service containers that are dependencies of the second micro-service container. At least one of the controller or the agent can update routing data for the first set of micro-service containers and the second set of micro-service containers. At least one of the controller or the agent can determine the second micro-service container has terminated on the host computing device. At least one of the controller or the agent can update the agent to remove the routing data for the second set of micro-service containers.

20 Claims, 9 Drawing Sheets

(56) References Cited

U.S. PATENT DOCUMENTS

| | | | |
|---|---|---|---|
| 8,266,615 | B2 | 9/2012 | Shapiro |
| 10,289,457 | B1* | 5/2019 | Slawomir ................. G06F 9/54 |
| 2005/0097087 | A1* | 5/2005 | Punaganti Venkata ...................... H04L 67/16 |
| 2006/0130060 | A1 | 6/2006 | Anderson et al. |
| 2008/0295109 | A1 | 11/2008 | Huang et al. |
| 2010/0299437 | A1* | 11/2010 | Moore ................ H04L 67/1008 709/226 |
| 2016/0103838 | A1* | 4/2016 | Sainani ............... H04L 41/5012 707/725 |
| 2016/0124742 | A1 | 5/2016 | Rangasamy et al. |
| 2017/0118137 | A1* | 4/2017 | Nanjundaswamy .. G06F 9/5077 |
| 2018/0006935 | A1* | 1/2018 | Mutnuru ............. H04L 12/4633 |
| 2018/0152534 | A1* | 5/2018 | Kristiansson ....... H04L 67/1002 |

OTHER PUBLICATIONS

Richardson et al. ,"Microservices—From Design to Deployment," May 18, 2016. pp. 1-80.

Communication pursuant to Article 94(3) EPC from the European Patent Office dated Jun. 29, 2021, 11 pages, for corresponding EP Application No. 17740589.1.

English translation of the First Office Action and Search Report, dated Sep. 24, 2021 by the National Intellectual Property Administration, PRC, 16 pages, for corresponding Chinese Patent Application No. 201780045225.0.

* cited by examiner

SCALING SERVICE DISCOVERY IN A MICRO-SERVICE ENVIRONMENT

CROSS-REFERENCE TO RELATED APPLICATIONS

This application is a continuation of U.S. application Ser. No. 15/217,331, filed on Jul. 22, 2016, the content of which is incorporated herein by reference in its entirety.

TECHNICAL FIELD

This disclosure relates in general to the field of computer networks and, more particularly, pertains to scaling service discovery in a micro-service environment.

BACKGROUND

Container based micro-services is an architecture that is quickly being adopted in the Data Center/Cloud Industry. Rather than build a single monstrous, monolithic application, container based micro-services split the application into a set of smaller interconnected micro-services. In micro-service architecture, service discovery plays a very important role, as container instances have dynamically assigned network locations and change dynamically due to auto-scaling, failures and upgrades. Current systems utilize a server-side discovery load balancer that acts as a proxy to connect a container instance with other container instances providing micro-services. To make service discovery work, however, the proxy needs to track all container instances for each micro-service. In some instances, a single application can contain hundreds of service and hundreds of container instances providing each of the micro-services. As a result, in data center deploying multiple applications, each server-side discovery load balancer or proxy may have to track hundreds of thousands or even millions of container instances. Accordingly, improvements are needed.

BRIEF DESCRIPTION OF THE DRAWINGS

In order to describe the manner in which the above-recited features and other advantages of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting its scope, the principles herein are described and explained with additional specificity and detail through the use of the accompanying drawings in which.

DESCRIPTION OF EXAMPLE EMBODIMENTS

Figure 1:
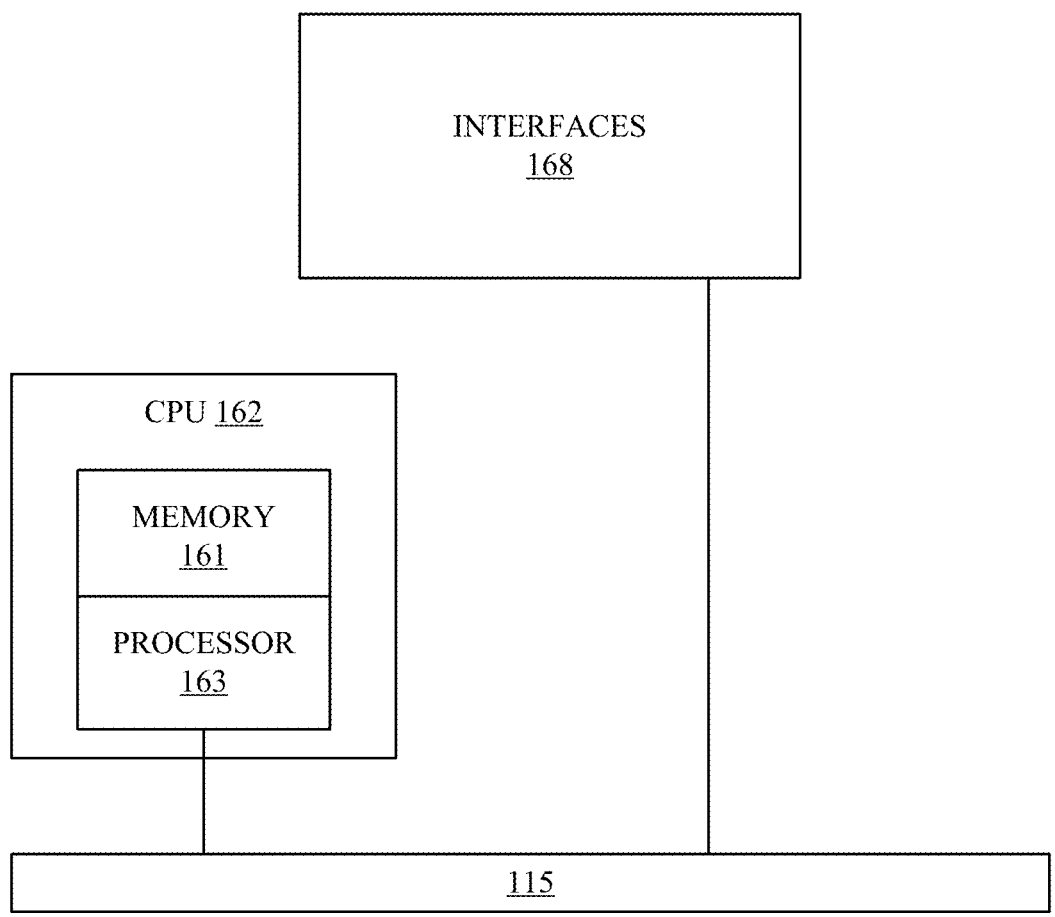
FIG. 1 illustrates an example network device according to some aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview:

Disclosed are systems, methods, and computer-readable storage media for scaling service discovery in a micro-service environment. A controller can instantiate, on a host computing device, a first container instance providing a first micro-service of an application. The host computing device can include a service discovery agent. The controller can identify a set of micro-services that are dependencies of the first micro-service, and update the service discovery agent with routing data for container instances providing the set of micro-services that are dependencies of the first micro-service. The service discovery agent can use the routing data to route requests from the first container instance to container instances providing the set of micro-services that are dependencies of the first micro-service.

Detailed Description:

Disclosed are systems and methods for scaling service discovery in a micro-service environment. A brief introductory description of exemplary systems and networks, as illustrated in FIGS. 1 through 4, is disclosed herein, followed by a discussion of scaling service discovery in a micro-service environment. The disclosure now turns to FIG. 1.

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which virtual machines (VMs) and micro-service containers communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs and micro-service containers to be attached to the physical network via respective virtual LANs (VLANs). The VMs and micro-service containers can be grouped according to their respective VLAN, and can communicate with other VMs and micro-service containers as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints (e.g., micro-service containers) in a network to apply connectivity and policy to the group. EPGs can act as a container for buckets or collections of micro-service containers, applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), micro-service containers, etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), micro-service containers, databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

FIG. 1 illustrates an exemplary network device 110 suitable for implementing the present technology. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such policy enforcement, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of network device 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the network device 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control, and management. By providing separate processors for the communications intensive tasks, these interfaces allow the master microprocessor 162 to efficiently perform routing computations, network diagnostics, security functions, etc.

Although the system shown in FIG. 1 is one specific network device of the present technology, it is by no means the only network device architecture on which the present technology can be implemented. For example, an architecture having a single processor that handles communications as well as routing computations, etc. is often used. Further, other types of interfaces and media could also be used with the network device.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2A:
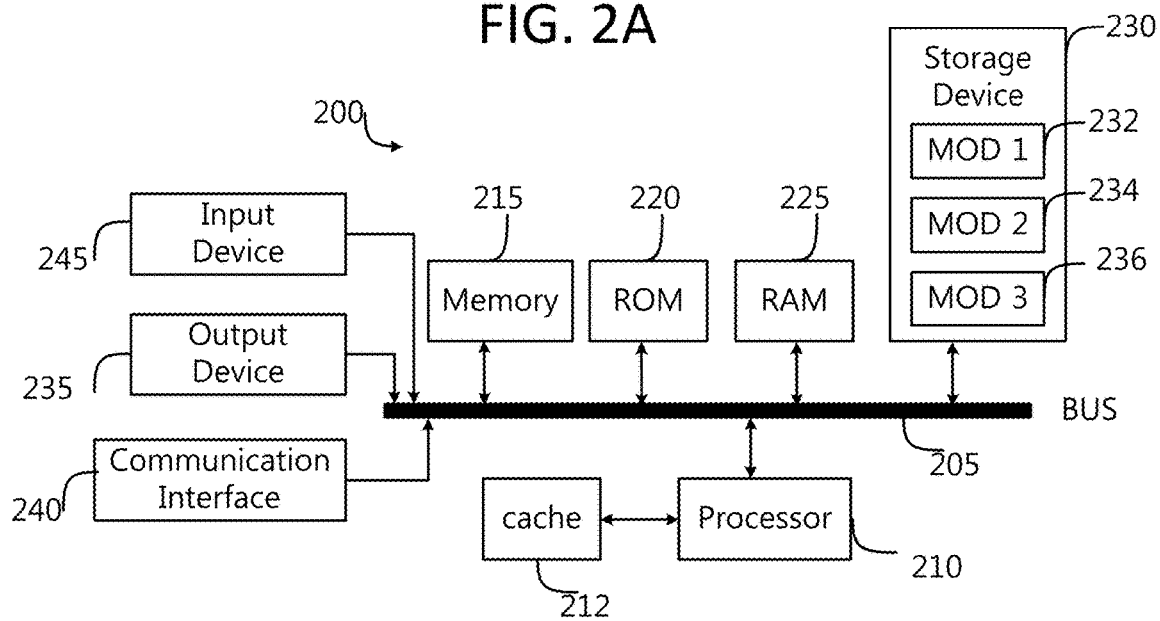
FIGS. 2A and 2B illustrate an example system embodiments according to some aspects of the subject technology.
Figure 2B:
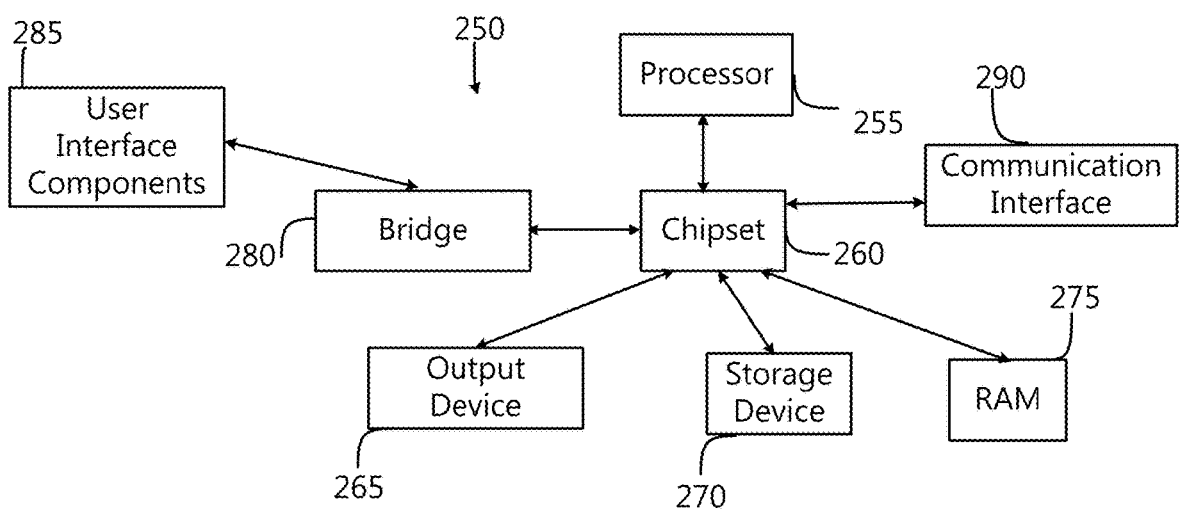

FIG. 2A, and FIG. 2B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, output device 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or RAM 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

Figure 3:
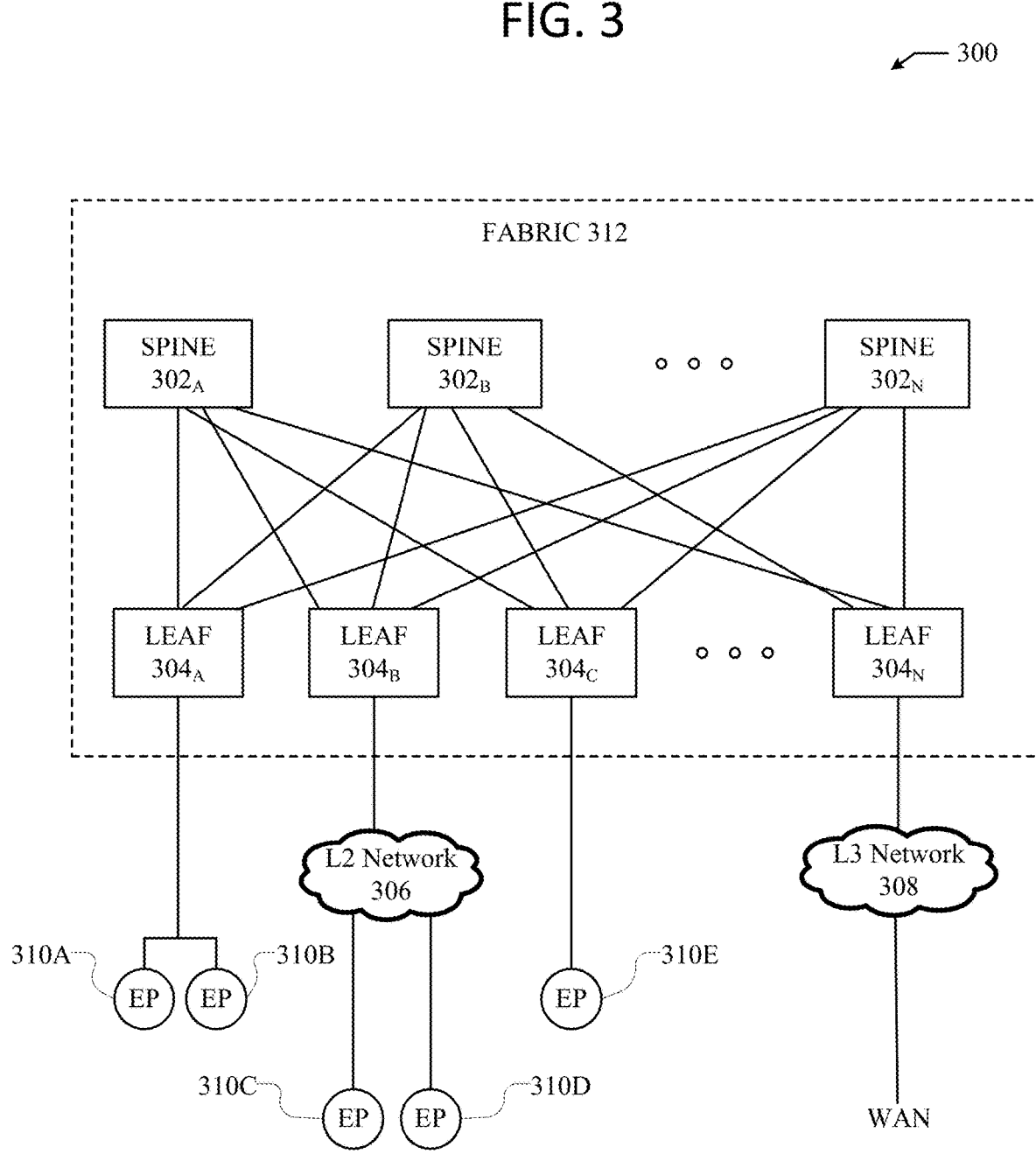
FIG. 3 illustrates a schematic block diagram of an example architecture for a network fabric.

FIG. 3 illustrates a schematic block diagram of an example architecture 300 for a network fabric 312. The network fabric 312 can include spine switches $302_A$, $302_B$, . . . , $302_N$ (collectively "302") connected to leaf switches $304_A$, $304_B$, $304_C$ . . . $304_N$ (collectively "304") in the network fabric 312.

Spine switches 302 can be L3 switches in the fabric 312. However, in some cases, the spine switches 302 can also, or otherwise, perform L2 functionalities. Further, the spine switches 302 can support various capabilities, such as 40 or 10 Gbps Ethernet speeds. To this end, the spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated tenant packet to get to the destination locator address of the tenant. The spine switches 302 can then perform a lookup of their local mapping database to determine the correct locator address of the packet and forward the packet to the locator address without changing certain fields in the header of the packet.

When a packet is received at a spine switch $302_i$, the spine switch $302_i$ can first check if the destination locator address is a proxy address. If so, the spine switch $302_i$ can perform the proxy function as previously mentioned. If not, the spine switch $302_i$ can look up the locator in its forwarding table and forward the packet accordingly.

Spine switches 302 connect to leaf switches 304 in the fabric 312. Leaf switches 304 can include access ports (or non-fabric ports) and fabric ports. Fabric ports can provide uplinks to the spine switches 302, while access ports can provide connectivity for devices, hosts, endpoints, VMs, micro-service containers, or external networks to the fabric 312.

Leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies. The leaf switches 304 can also represent aggregation switches, for example.

The leaf switches 304 can be responsible for routing and/or bridging the data packets and applying network policies. In some cases, a leaf switch can perform one or more additional functions, such as implementing a mapping cache, sending packets to the proxy function when there is a miss in the cache, encapsulating packets, enforcing ingress or egress policies, etc.

Moreover, the leaf switches 304 can contain virtual switching functionalities, such as a virtual tunnel endpoint (VTEP) function as explained below in the discussion of VTEP 408 in FIG. 4. To this end, leaf switches 304 can connect the fabric 312 to an overlay network, such as overlay network 400 illustrated in FIG. 4.

Network connectivity in the fabric 312 can flow through the leaf switches 304. Here, the leaf switches 304 can provide servers, resources, endpoints, external networks, micro-service containers or VMs access to the fabric 312, and can connect the leaf switches 304 to each other. In some cases, the leaf switches 304 can connect EPGs to the fabric 312 and/or any external networks. Each EPG can connect to the fabric 312 via one of the leaf switches 304, for example.

Endpoints 310A-E (collectively "310") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

Endpoints 310 can include any communication device, such as a computer, a server, a switch, a router, etc. In some cases, the endpoints 310 can include a server, hypervisor, or switch configured with a VTEP functionality which connects an overlay network, such as overlay network 400 below, with the fabric 312. For example, in some cases, the endpoints 310 can represent one or more of the VTEPs 408A-D illustrated in FIG. 4. Here, the VTEPs 408A-D can connect to the fabric 312 via the leaf switches 304. The overlay network can host physical devices, such as servers, applications, EPGs, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
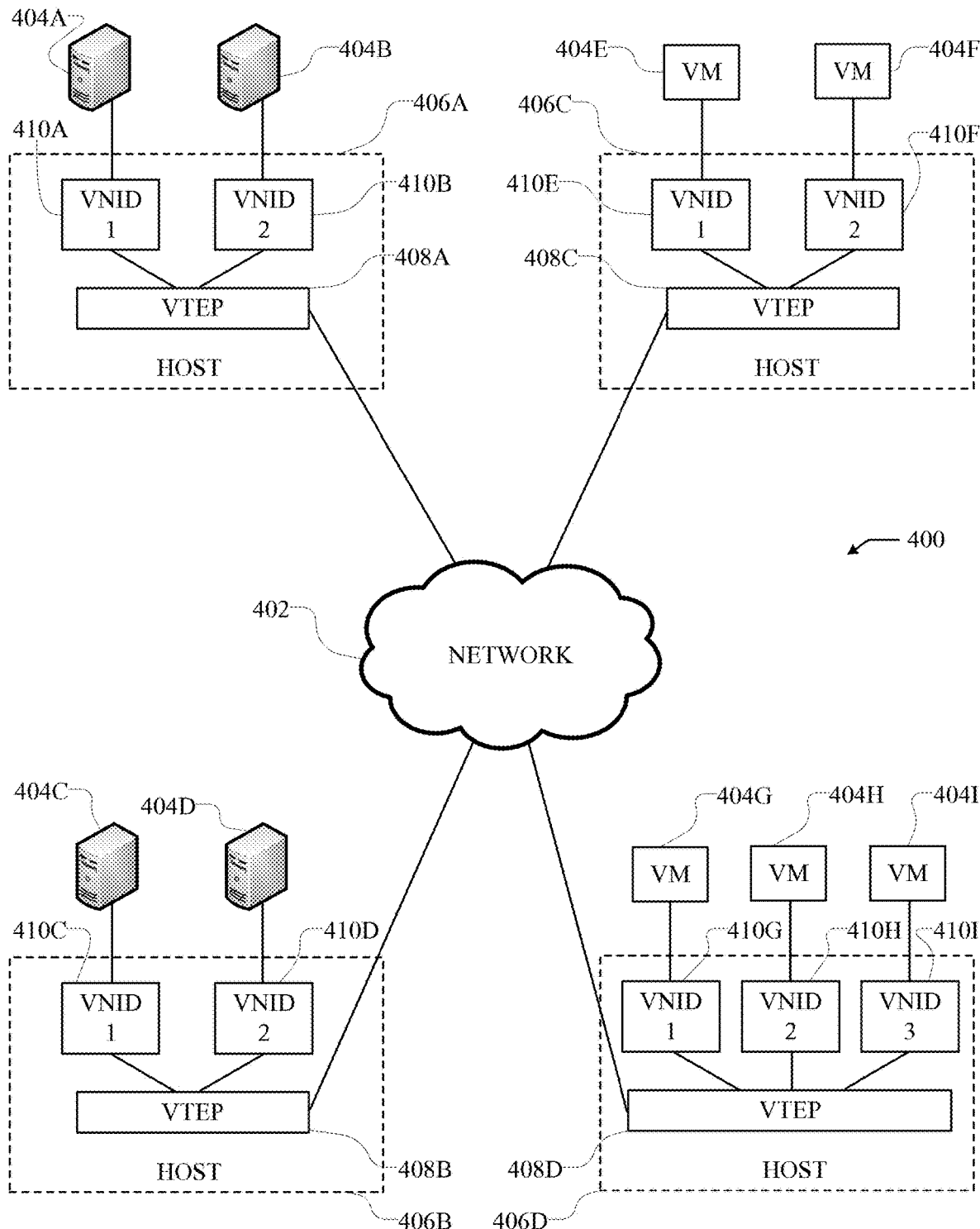
FIG. 4 illustrates an example overlay network.

FIG. 4 illustrates an exemplary overlay network 400. Overlay network 400 uses an overlay protocol, such as VXLAN, NVGRE, NVO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network, for example. Moreover, network 402 can connect the overlay network 400 with the fabric 312 in FIG. 3. For example, VTEPs 408A-D can connect with the leaf switches 304 in the fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through micro-service container or VMs loaded on the servers, for example.

In some embodiments, network 400 can be a VXLAN network, and VTEPs 408A-D can be VXLAN tunnel end points (VTEP). However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 2, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VMs 404F and 404H because they all reside in VNID 2. VMs 404E-I can host virtual workloads, which can include application workloads, resources, and services, for example. However, in some cases, servers 404A-D can similarly host virtual workloads through VMs hosted on the servers 404A-D. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

Depending on the desired implementation in the network 400, a variety of networking and messaging protocols may be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the network 400 illustrated in FIG. 4 is used for purposes of explanation, a network system may be implemented with many variations, as appropriate, in the configuration of network platform in accordance with various embodiments of the present disclosure.

Having disclosed a brief introductory description of exemplary systems and networks, the discussion now turns to scaling service discovery in a micro-service environment. Rather than build a single monstrous, monolithic application, container based micro-services split the application into a set of smaller interconnected micro-services. Multiple container instances can be instantiated to provide the various micro-services, allowing the application to be easily scaled as needed. Each instantiated container instance can be assigned its own IP address and port number and distributed throughout a data center on various nodes in the network. The IP addresses and port numbers can be used to provide network based communications between the container instances to provide the application.

A server-side service discovery agent can be used to manage communications between the container instances. A host node can include a service discovery agent that acts as a load balancer/proxy to connect a container instance on the host node with other container instances providing other micro-services of the application. The service discovery agent on a host can receive and direct packets to and from the container instances. The service discovery agent can maintain routing data (e.g., IP addresses and port values) for other container instances in the network, which can be used to route received requests to an appropriate container instance.

To reduce the number of container instances that need to be tracked by a service discovery agent, a controller in the network can be configured to update the service discovery agent to either provide new routing data or remove routing data based on the container instances on the host node. For example, the controller can update the service discovery agent to only include routing data for container instances providing micro-services that are dependencies of micro-services provided by container instances instantiated on the host node. Accordingly, a service discovery agent will not include unnecessary routing data, thereby reducing memory usage and increasing throughput.

FIGS. 5A-5D illustrate an example system configured to scale service discovery in a micro-service environment. As shown, in FIG. 5A, system 500 includes controller 502 and host computing device 504. Controller 500 and host computing device 504 can be any type of computing device, node, VM, etc., in a network. Although controller 502 and host computing device 504 are shown as separate entities, in some embodiments controller 502 and host computing device 504 can reside on the same computing device. For example, controller 502 can reside on host computing device 504.

Host computing device 504 can be configured to host one or more container instances, each providing a micro-service. Each container instance can be assigned a unique IP address and port number to allow for network based communication between the container instances distributed throughout the network.

Host computing device 504 can include service discovery agent 506 configured to manage communications between container instances included on host computing device 504 and other container instances distributed throughout the network. For example, service discovery agent 506 can be a load balancer and/or proxy configured to inspect and direct packets to and from the container instances. For example, local container instances on host computing device 504 can transmit requests that are inspected by service discovery agent 506 and service discovery agent 506 can then route the requests to an appropriate container instance in the network. To accomplish this, service discovery agent 506 can maintain routing data (e.g., IP address and port values) for other container instances in the network, which can be used to route requests to an appropriate container instance.

Controller 502 can be configured to update service discovery agent 506 to reduce the amount of routing data maintained by service discovery agent 506. Some micro-services of an application may be related to other micro-services of the application that are dependencies. For instance, some micro-services may require the functionality of one or more micro-services and may need to make Application Programming Interface (API) calls to those micro-services as part of their functioning. As an example, a micro-service providing a payment functionality of an application may require the use of another micro-service providing a notification functionality to notify a user that a payment has been completed. Accordingly, the notification micro-service is a dependency of the payment micro-service.

While a micro-service may be related to a set of one or more other micro-services that are dependencies of the micro-service, this is not the case for all micro-services of an application. Some micro-services may not have any dependencies. Further, a micro-service may only be related to a subset of the total micro-services of an application, meaning that not all micro-services are dependencies of each other. Accordingly, service discovery agent 506 only needs to maintain routing data for container instances that provide micro-services that are dependencies of micro-services provided by container instances on host computing device 504.

Controller 502 can be configured to update service discovery agent 506 to include only the routing data necessary based on the container instances on host computing device 504. For example, in response to a container instance being instantiated on host computing device 504, controller 502 can determine a set of micro-services that are dependencies of the micro-service provided by the newly instantiated container instance, and then update service discovery agent 506 with routing data for container instances providing the set of micro-services. Likewise, in response to a container instance being removed from host computing device 504, controller 502 can update service discovery agent 506 to remove routing data for container instances that are dependencies of the micro-service provided by the removed container instance. For example, controller 502 can check the remaining container instances and determine their corresponding dependencies. Controller 502 can then update the routing data accordingly.

In some embodiments, controller 502 can maintain a micro-service dependencies table that identifies the dependencies for a particular application. In response to determining that a container instance has been added or removed from host computing device 504, controller 502 can search the micro-service dependency table to identify the set of micro-services that are dependencies of the micro-service provided by the added or removed container instance. Alternatively, in some embodiments, container instances providing a specific micro-service can all be added to an end point group and associated with a group based policy defining the micro-services that are dependencies. In response to determining that a container instance has been added or removed from host computing device 504, controller 502 can gather the set of micro-services that are dependencies of the micro-service based on the group based policy associated with the container instance that was added or removed.

Figure 5A:
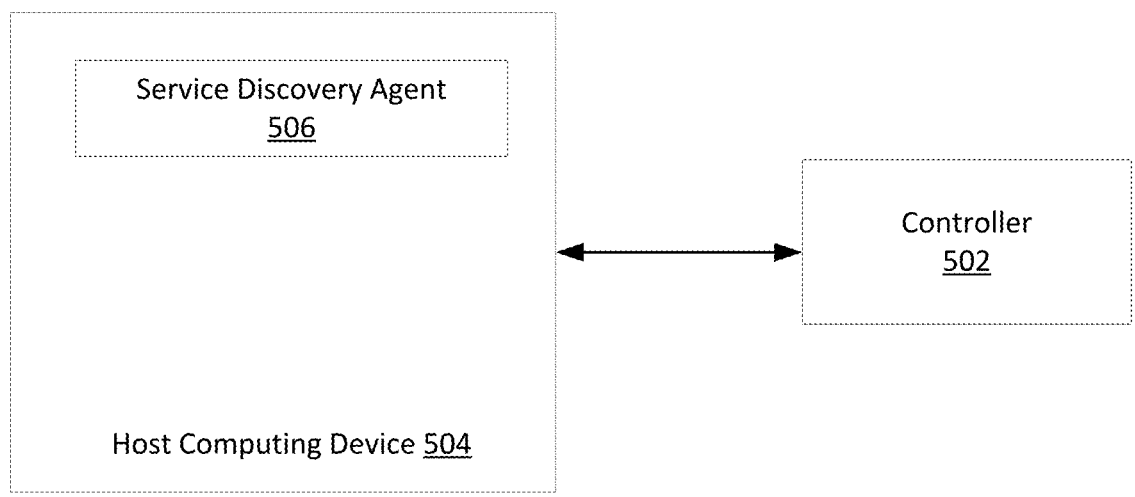
FIGS. 5A-5D illustrate an example system configured to scale service discovery in a micro-service environment.
Figure 5B:
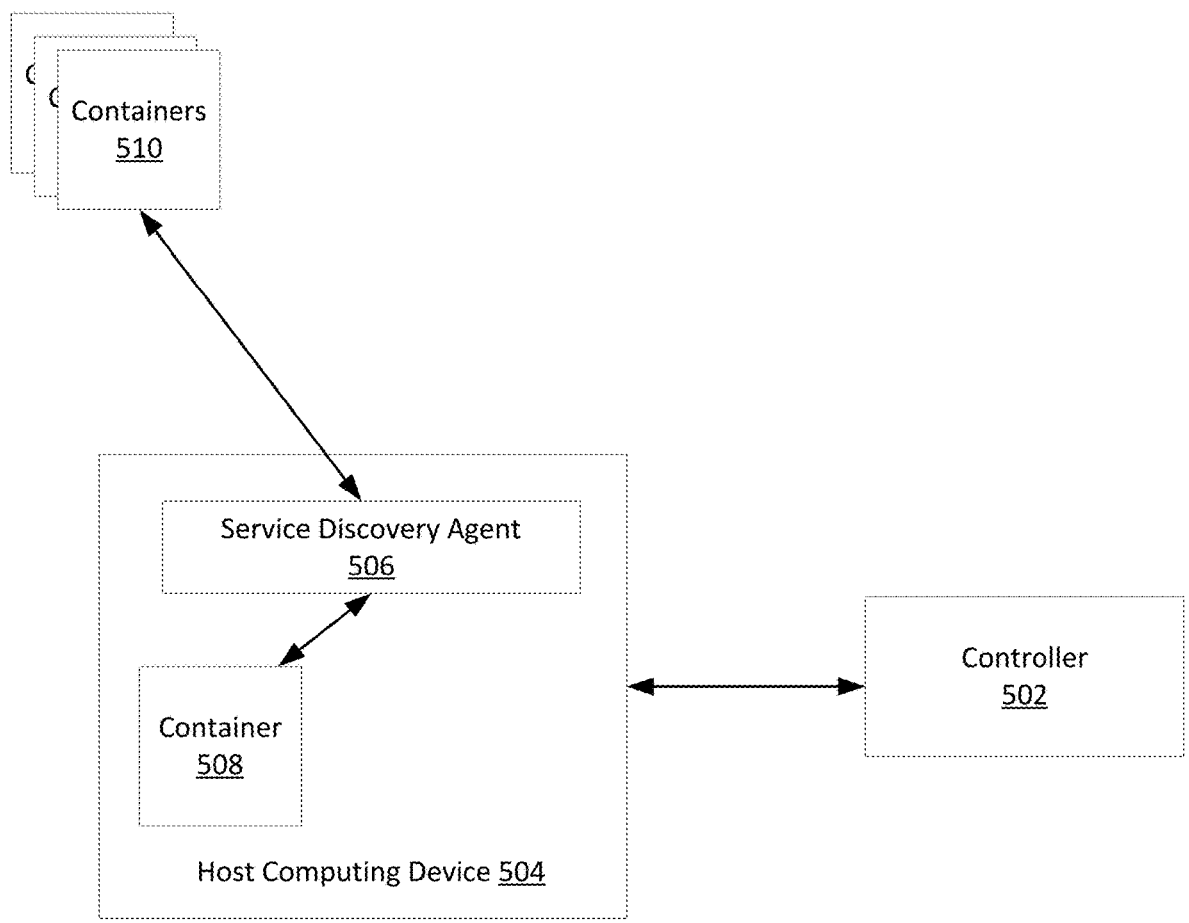

FIG. 5B shows system 500 after a container instance has been instantiated on host computing device 504. As shown, container instance 508 has been instantiated on host computing device 504. Container instance 508 can be providing micro-service 1. As further shown, controller 502 has updated service discovery agent 506 to include routing data for container instances 510, which provide a set of micro-services that are dependencies of micro-service 1, provided by container instance 508. To utilize a micro-service provided by one of container instances 510, container instance 508 can communicate with service discovery agent 506, which acts as load balancer and/or proxy and routes the request to one of container instances 510.

Figure 5C:
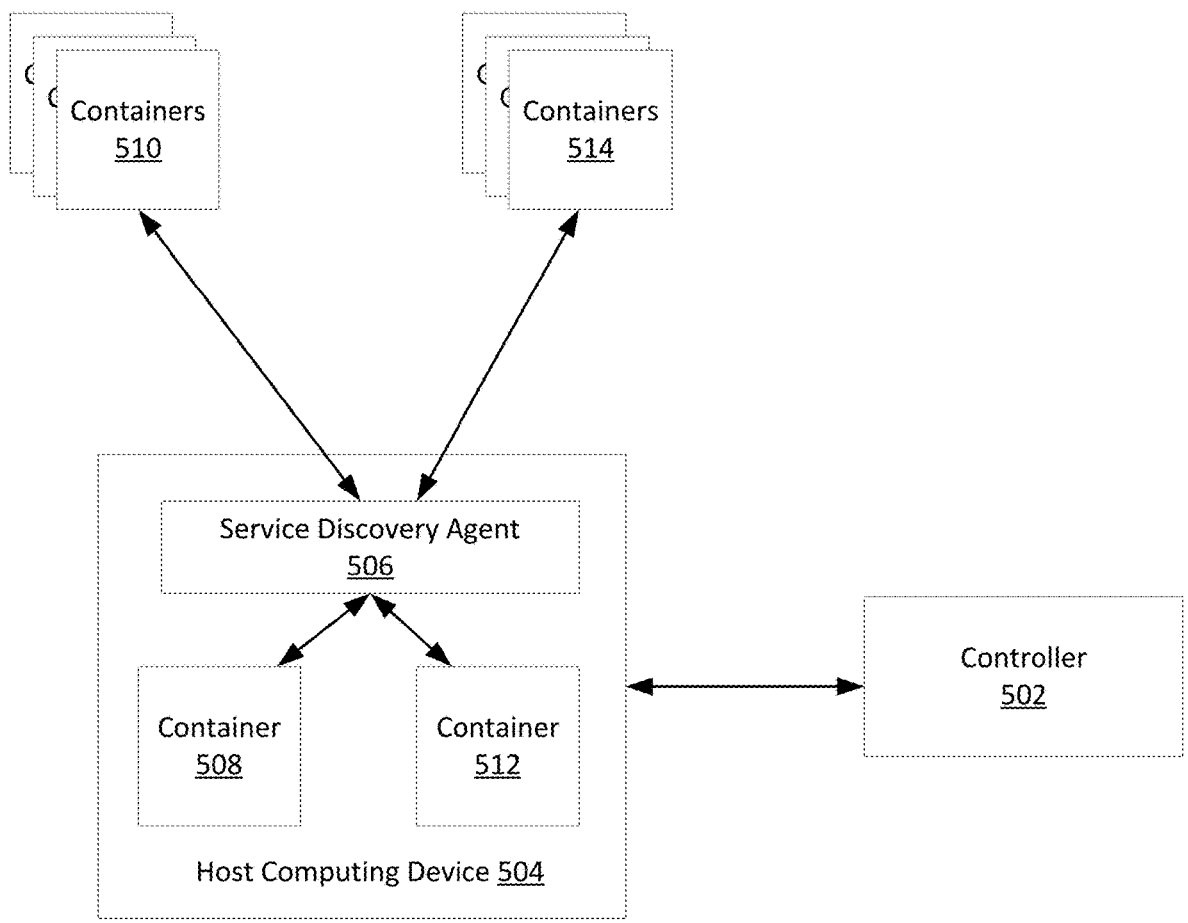

FIG. 5C shows system 500 after a second container instance has been instantiated on host computing device 504. As shown, container instance 512 has been instantiated on container instance 504. Container instance 512 can provide micro-service 2. Further, controller 502 has updated service discovery agent 506 to include routing data for container instances 514 that provide micro-services that are dependencies of micro-service 2. In some instances, micro-service 1 and micro-service 2 may both share certain dependencies. Accordingly, upon container instance 512 being instantiated on host computing device 504, controller 502 can identify a subset of micro-services that are dependencies of micro-service 2 that are not included in the set of micro-services that are dependencies of micro-service 1, provided by container instance 508. Because service discovery agent 506 already has routing data for container instances providing any micro services that are dependencies of both micro-service 1 and micro-service 2, controller 502 can update service discovery agent 506 with routing data for the subset of micro-services that are dependencies of micro-service 2 that are not included in the set of micro-services that are dependencies of micro-service 1.

Figure 5D:
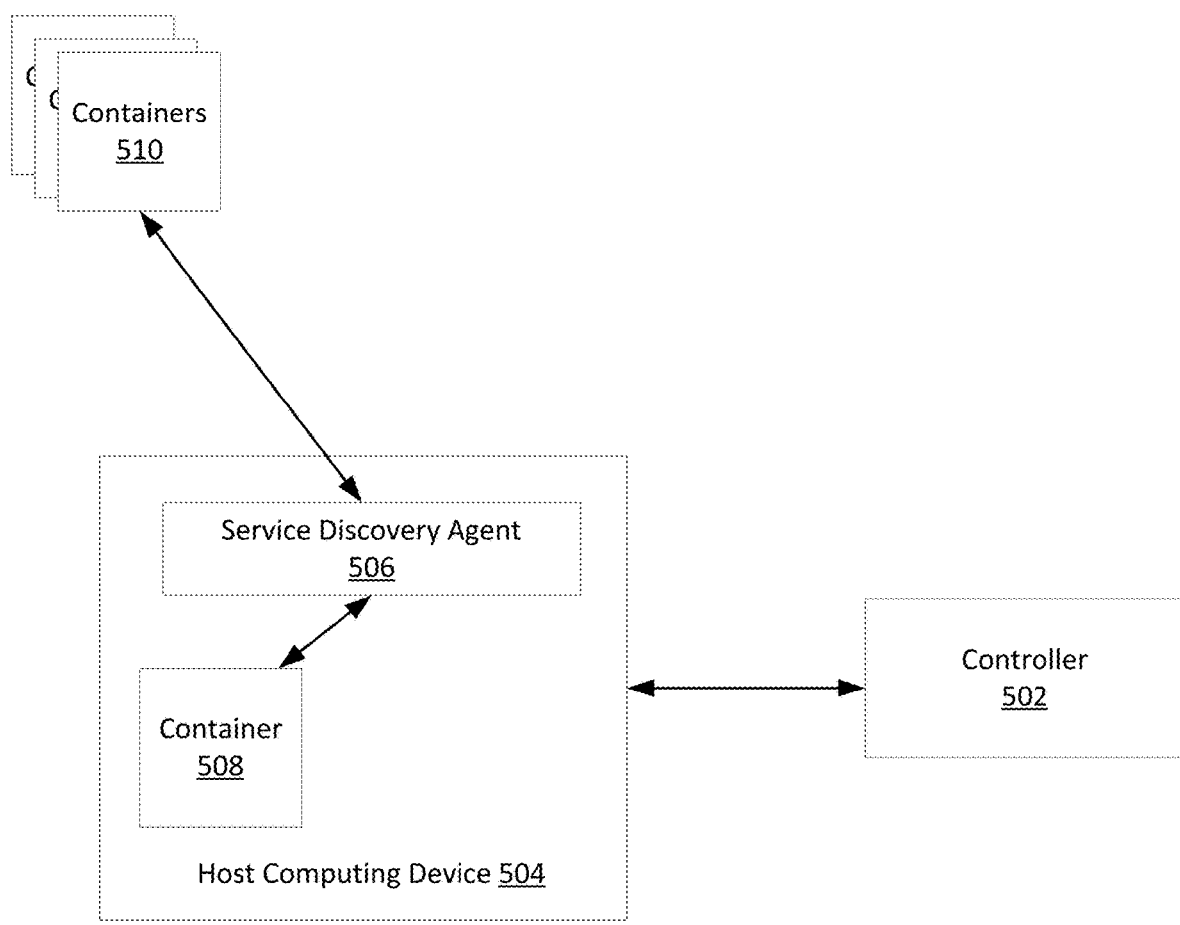

FIG. 5D shows system 500 after a container instance has been removed from host computing device 504. As shown, container instance 510 has been removed form host computing device 504. Further, controller 502 has removed container instances 514, which provide services that are dependencies of micro-service 2 but are not dependencies of micro-service 1. Routing data for container instances that provide micro-services for both micro-service 1 and micro-service 2 can be maintained by service discovery agent 506 to continue servicing container instance 508.

Figure 6:
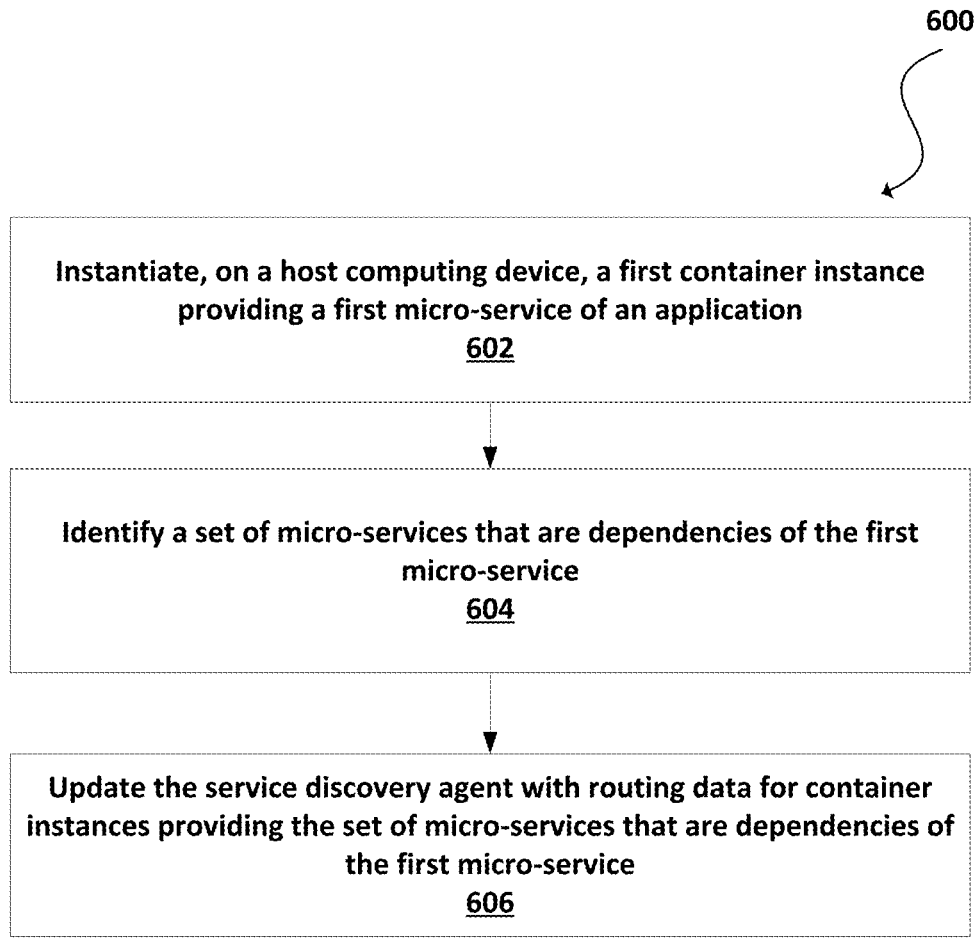
FIG. 6 illustrates an example method of scaling service discovery in a micro-service environment.

FIG. 6 illustrates an example method 600 of scaling service discovery in a micro-service environment. It should be understood that there can be additional, fewer, or alternative steps performed in similar or alternative orders, or in parallel, within the scope of the various embodiments unless otherwise stated.

At step 602, a controller can instantiate, on a host computing device, a first container instance providing a first micro-service of an application. The host computing device can include a service discovery agent configured to manage communications between the first container instance and container instances on other host computing devices.

At step 604, the controller can identify a set of micro-services that are dependencies of the first micro-service. For example, the host controller can search a micro-service dependencies table of the application for the set of micro-services that are dependencies of the first micro-service. The micro-service dependencies table can list micro-services of the application and their corresponding dependencies.

As another example, the controller can gather the set of micro-services that are dependencies of the first micro-service from a group based policy associated with an end point group to which the first container instance is assigned. The end point group can include only container instances providing the first micro-service and the group based policy can identify dependencies of the first micro-service.

At step 606, the controller can update the service discovery agent with routing data for container instances providing the set of micro-services that are dependencies of the first micro-service. The service discovery agent can use the routing data to route requests from the first container instance to container instances providing the set of micro-services that are dependencies of the first micro-service.

As one of ordinary skill in the art will readily recognize, the examples and technologies provided above are simply for clarity and explanation purposes, and can include many additional concepts and variations.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

For clarity of explanation, in some instances the present technology may be presented as including individual functional blocks including functional blocks comprising devices, device components, steps or routines in a method embodied in software, or combinations of hardware and software.

Note that in certain example implementations, the optimization and/or placement functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
    injecting, by a controller, a service discovery agent onto a host;
    identifying one or more first micro-services provided by a first container instantiated on the host, one or more second micro-services provided by a second container instantiated on the host, one or more third micro-services provided by one or more third containers depending from the first container, and one or more fourth micro-services provided by one or more fourth containers depending from the second container;
    updating the service discovery agent with first routing data to the one or more third containers and second routing data to the one or more fourth containers, wherein the first routing data includes routes from the first container to the one or more third containers and the second routing data includes routes from the second container to the one or more fourth containers;
    determining the second container has terminated; and
    updating the service discovery agent to remove at least the routes from the second container in the second routing data.

2. The computer-implemented method of claim 1, wherein the host is a physical server.

3. The computer-implemented method of claim 1, wherein the host is a virtual machine.

4. The computer-implemented method of claim 3, further comprising:
    load-balancing requests to the one or more third containers.

5. The computer-implemented method of claim 1, further comprising:
    checking for dependencies from the first container in response to instantiation of the second container on the host.

6. The computer-implemented method of claim 5, further comprising:
    determining a new dependency from the first container to one or more fifth containers; and
    updating the service discovery agent with third routing data to the one or more fifth containers.

7. The computer-implemented method of claim 6, further comprising:
    determining there is at least one common container among the fourth containers and the fifth containers, wherein the third routing data excludes routing data to the at least one common container.

8. The computer-implemented method of claim 5, further comprising:
    determining at least one container of the one or more third containers has terminated; and
    updating the service discovery agent to remove routing data to the at least one container.

9. The computer-implemented method of claim 1, further comprising:
    determining at least one common container among the third containers and the fourth containers, wherein the second routing data exclude routing data to the at least one common container.

10. The computer-implemented method of claim 1, further comprising:
    determining the second container depends from at least one container; and
    updating a second service discovery agent on a second host of the at least one container to remove third routing data to the second container.

11. A system, comprising:
    one or more processors; and
    memory including instructions that, when executed by the one or more processors, cause the system to:
    inject a service discovery agent onto a host;
    identify one or more first micro-services provided by a first container instantiated on the host, one or more second micro-services provided by a second container instantiated on the host, one or more third micro-services provided by one or more third containers depending from the first container, and one or more fourth micro-services provided by one or more fourth containers depending from the second container;
    update the service discovery agent with first routing data to the one or more third containers and second routing data to the one or more fourth containers, wherein the first routing data includes routes from the first container to the one or more third containers and the second routing data includes routes from the second container to the one or more fourth containers;
    determine the second container has terminated; and
    update the service discovery agent to remove at least the routes from the second container in the second routing data.

12. The system of claim 11, wherein the host is a physical server.

13. The system of claim 11, wherein the host is a virtual machine.

14. The system of claim 11, further comprising further instructions that, when executed by the one or more processors, further cause the system to:
    load-balance requests to the one or more third containers.

15. The system of claim 11, further comprising further instructions that, when executed by the one or more processors, further cause the system to:
    check for dependencies from the first container in response to instantiation of the second container on the host.

16. The system of claim 15, further comprising further instructions that, when executed by the one or more processors, further cause the system to:
    determine a new dependency from the first container to one or more fifth containers; and
    update the service discovery agent with third routing data to the one or more fifth containers.

17. The system of claim 16, further comprising further instructions that, when executed by the one or more processors, further cause the system to:
    determine there is at least one common container among the fourth containers and the fifth micro containers, wherein the third routing data excludes routing data to the at least one common container.

18. The system of claim 16, further comprising further instructions that, when executed by the one or more processors, further cause the system to:

determine at least one container of the one or more third containers has terminated; and update the service discovery agent to remove routing data to the at least one container.

19. The system of claim 11, further comprising further instructions that, when executed by the one or more processors, further cause the system to:

determine at least one common container among the third containers and the fourth containers, wherein the second routing data excludes routing data to the at least one common container.

20. The system of claim 11, further comprising further instructions that, when executed by the one or more processors, further cause the system to:

determine the second container depends from at least one container; and update a second service discovery agent on a second host of the at least one container to remove third routing data to the second container.

* * * * *